United States Patent [19]

Tanaka

[11] Patent Number: 4,862,261
[45] Date of Patent: Aug. 29, 1989

[54] IMAGE SIGNAL COMPRESSING METHOD BY VECTOR QUANTIZATION

[75] Inventor: Nobuyuki Tanaka, Kanagawa, Japan

[73] Assignee: Fuji Photo Film Co., Ltd., Kanagawa, Japan

[21] Appl. No.: 160,373

[22] Filed: Feb. 25, 1988

[30] Foreign Application Priority Data

Feb. 25, 1987 [JP] Japan .................. 62-42115
Feb. 24, 1988 [JP] Japan .................. 63-41717

[51] Int. Cl.[4] ............................................. H04N 7/12
[52] U.S. Cl. ..................................... 358/133; 358/135
[58] Field of Search ............... 350/133, 138, 136, 135, 350/141, 260, 262

[56] References Cited

U.S. PATENT DOCUMENTS

| 4,541,012 | 9/1985 | Tescher | 358/133 |
| 4,558,350 | 12/1985 | Murakami | 358/133 X |
| 4,670,851 | 6/1987 | Murakami et al. | 358/136 X |
| 4,710,812 | 12/1987 | Murakami et al. | 358/136 |

Primary Examiner—James J. Groody
Assistant Examiner—Victor R. Kostak
Attorney, Agent, or Firm—Sughrue, Mion, Zinn, Macpeak & Seas

[57] ABSTRACT

A method of compressing image signals by vector quantization comprises the steps of dividing two-dimensional image signals into blocks B each comprising the signals at adjacent picture elements, selecting a vector that corresponds with the minimum distortion to differences between the image signals in each block B and a representative value m of signals or interpolation-predicted values for the image signals, and encoding the information representing the selected vector, and the information representing the representative value m or the information utilized for calculating the interpolation-predicted values. The two-dimensional image signals are divided into blocks B' deviated from the blocks B. For each of partial regions of the block B overlapping the blocks B', a representative value n calculated for the block B' including the partial region is used as the representative value m for the partial region. Or, the interpolation-predicted values in the block B are predicted based on the representative values n in all of the blocks B' partially overlapping the block B.

4 Claims, 3 Drawing Sheets

IMAGE SIGNAL COMPRESSING METHOD BY VECTOR QUANTIZATION

BACKGROUND OF THE INVENTION

1. Field of the Invention

This invention relates to a method of compressing image signals by vector quantization. This invention particularly relates to a method of compressing image signals by vector quantization, wherein generation of block distortion in a reconstructed image is prevented.

2. Description of the Prior Art

Image signals representing half tone images, such as television signals, are composed of enormous amounts of information, and a broad-band transmission line is required for transmission of the image signals. Such image signals involve much redundancy, and various attempts have been made to compress the image signals by restricting the redundancy. Also, in recent years, recording of half tone images on optical disks, magnetic disks, or the like has been generally put into practice. In this case, image signal compression is conducted generally for the purpose of efficiently recording image signals on a recording medium.

One of the methods of image signal compression that has heretofore been known is a method wherein vector quantization is utilized. The known method comprises the steps of (i) dividing two-dimensional image signals into blocks each comprising the signals at M number of picture elements adjacent to one another, (ii) selecting a vector that corresponds with the minimum distortion to the set of the image signals in each of the blocks from a code book comprising a plurality of vectors different from one another and prepared in advance by defining M number of vector elements, and (iii) encoding the information representing the selected vector to correspond to the block.

Since the image signals in the block as mentioned above have high correlation therebetween, the image signals in each block can be represented very accurately by one of a comparatively small number of vectors prepared in advance. Therefore, transmission or recording of the image signals can be carried out by transmitting or recording a code representing the vector, instead of the image signals themselves, and signal compression can thus be achieved. By way of example, the amount of the image signals at 64 picture elements in a half tone image of a density scale composed of 256 levels ($=8$ bits) is $8 \times 64 = 512$ bits. In the case where the 64 picture elements are grouped as a single block, the respective image signals in the block are expressed by a vector composed of 64 vector elements, and a code book including 256 such vectors is prepared, the amount of the signals per block becomes equal to the amount of the signals for discrimination between the vectors, i.e. 8 bits. Consequently, in this case, the amount of the signals can be compressed to 1/64.

After the image signals are compressed in the manner as mentioned above and recorded or transmitted in the compressed form, the vector elements of each of the vectors which the vector discriminating information represents are taken as reconstructed signals of each of the blocks, and the original image is reproduced by use of the reconstructed signals.

With the aforesaid method of compressing image signals, the vector discriminating information can be expressed with a shorter code length and the signal compressibility can be increased as the number of the vectors prepared in advance is smaller. Therefore, there have heretofore been proposed the methods of compressing image signals wherein the signal compressibility is improved from the aforesaid viewpoint by further advancing the vector quantization.

As such methods of compressing image signals, there have heretofore been known a technique of representative value separation type vector quantization and a technique of vector quantization of interpolation prediction errors. The former technique comprises the steps of calculating a representative value m (for example, a mean value) of the image signals in each block, selecting a vector whose vector elements correspond with the minimum distortion to differences ($x_1-m$, $x_2-m$, $x_3-m$, ..., $x_M-m$) between the respective image signals in the block and the representative value m from a code book, and encoding the vector discriminating information together with the information representing the representative value m.

The fluctuation width of the differences ($x_i-m$) becomes smaller than the fluctuation width of the original image signals $x_i$, and therefore the number of vectors which are to be prepared in advance, i.e. the size of the code book, may be small.

On the other hand, the technique of vector quantization of interpolation prediction errors comprises the steps of carrying out interpolation prediction of the image signals in each block in an appropriate manner, selecting a vector that correspond with the minimum distortion to the errors, i.e. the interpolation prediction errors, ($x_1-\dot{x}_1$, $x_2-\dot{x}_2$, $x_3-\dot{x}_3$, ..., $x_M-\dot{x}_M$) between the actual image signals $x_i$ and the interpolation-predicted values $\dot{x}_i$ from a code book, and encoding the vector discriminating information together with the information utilized for the interpolation prediction. Also, in this case, the fluctuation width of the interpolation prediction errors ($x_i-\dot{x}_i$) becomes smaller than the fluctuation width of the original image signals $x_i$, and therefore the number of vectors which are to be prepared in advance may be small. In both the representative value separation type vector quantization and the vector quantization of the interpolation prediction errors, the signals may be normalized.

In the course of reconstructing the image after compressing the image signals by the aforesaid advanced type vector quantization, the values obtained by adding the representative value m or the interpolation-predicted values $\dot{x}$ to the vector elements of the vector which the vector discriminating information represents may be used as the reconstructed signals, and the image may be reproduced on the basis of the reconstructed signals.

However, in the reconstructed image obtained in the manner as mentioned above, block distortion, i.e. a difference in density at the boundary between the blocks, readily arises.

SUMMARY OF THE INVENTION

The primary object of the present invention is to provide a method of compressing image signals by vector quantization, wherein generation of block distortion is prevented.

Another object of the present invention is to provide a method of compressing image signals by vector quantization, which enables an increase in the number of images recordable on a recording medium or an increase in the signal transmission efficiency.

The present invention provides a first method of compressing image signals by vector quantization, which comprises the steps of:

(i) dividing two-dimensional image signals into blocks B each of which is composed of the signals at M number of picture elements adjacent to one another, (ii) selecting a vector that corresponds with the minimum distortion to differences $(x_1-m, x_2-m, x_3-m, \ldots, x_M-m)$ between the image signals x in each of the blocks B and a representative value m of signals from a code book comprising a plurality of vectors different from one another and prepared in advance by defining M number of vector elements, and (iii) encoding the information representing the selected vector, and the information representing the representative value m, wherein the improvement comprises the steps of:

(a) dividing said two-dimensional image signals into blocks B' whose picture element regions are deviated from the picture element regions of said blocks B, (b) calculating a representative value n with respect to the image signals in each of said blocks B', and (c) for each of partial regions R, whose picture element regions overlap the picture element regions of said blocks B', within each of said blocks B, using said representative value n, which is calculated for one of said blocks B' that includes one of said partial regions R, as said representative value m for said one of said partial regions R.

In the case where the representative values n as mentioned above are utilized as the representative value m, the values of the differences $(x_i-m)$ in each block B subjected to vector quantization reflect the values of the image signals in the blocks B adjacent to said block B. Therefore, generation of the aforesaid block distortion is restricted.

The present invention also provides a second method of compressing image signals by vector quantization, which comprises the steps of:

(i) dividing two-dimensional image signals into blocks B each of which is composed of the signals at M number of picture elements adjacent to one another, (ii) selecting a vector that corresponds with the minimum distortion to errors $(x_1-\dot{x}_1, x_2-\dot{x}_2, x_3-\dot{x}_3, \ldots, x_M-\dot{x}_M)$ between the image signals x in each of the blocks B and interpolation-predicted values $\dot{x}$ for the image signals x from a code book comprising a plurality of vectors different from one another and prepared in advance by defining M number of vector elements, and (iii) encoding the information representing the selected vector, and the information utilized for calculating the interpolation-predicted values $\dot{x}$, wherein the improvement comprises the steps of:

(a) dividing said two-dimensional image signals into blocks B' whose picture element regions are deviated from the picture element regions of said blocks B, (b) calculating a representative value n with respect to the image signals in each of said blocks B', and (c) predicting said interpolation-predicted values $\dot{x}$ in each of said blocks B on the basis of said representative values n with respect to all of said blocks B' whose picture element regions partially overlap the picture element region of each of said blocks B.

In the case where the interpolation-predicted values x are calculated in the manner as mentioned above, the values of the interpolation prediction errors $(x_i-\dot{x}_i)$ in each block B subjected to vector quantization reflect the values of the image signals in the blocks B adjacent to said block B. Therefore, generation of the aforesaid block distortion is restricted.

With the method of compressing image signals by vector quantization in accordance with the present invention, generation of the block distortion in reconstruction can be prevented with the signal compressibility being maintained substantially high by the utilization of the technique of representative value separation type vector quantization or the technique of vector quantization of interpolation prediction errors. Accordingly, with the method of compressing image signals by vector quantization in accordance with the present invention, the effects of increasing the number of the images recordable on a recording medium or the effects of markedly reducing the signal transmission path and shortening the transmission time can be achieved and, at the same time, a reconstructed image having a high image quality can be obtained.

DESCRIPTION OF THE PREFERRED EMBODIMENTS

The present invention will hereinbelow be described in further detail with reference to the accompanying drawings.

Figure 1:
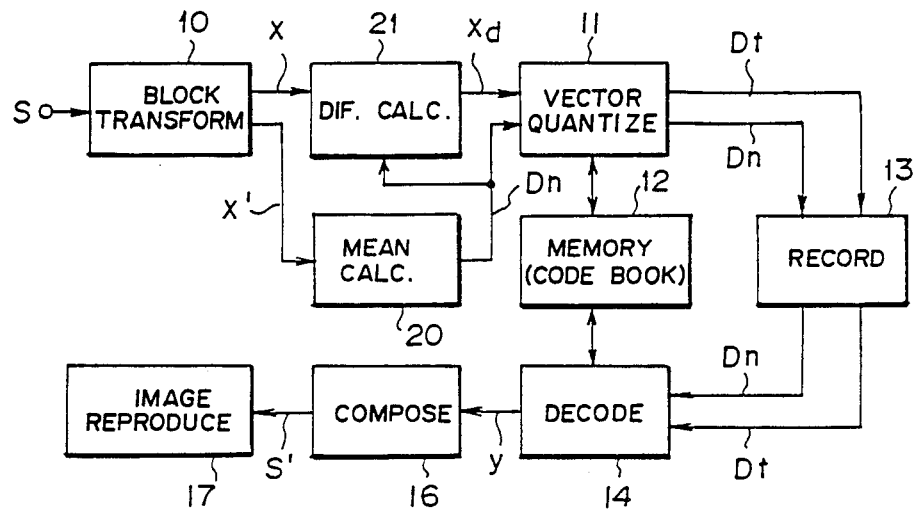
FIG. 1 is a block diagram showing the configuration of an apparatus for carrying out the first method of compressing image signals by vector quantization in accordance with the present invention.
Figure 2:
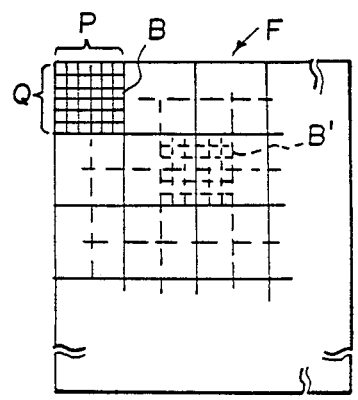
FIG. 2 is an explanatory view showing the division of image signals into blocks.

With reference to FIG. 1, original image signals S representing a single continuous tone image are fed to a block transformation circuit 10 in which they are transformed into image signals x of each of rectangular blocks which comprises $P \times Q = M$ picture elements adjacent to one another. The division into the blocks is shown in FIG. 2. With reference to FIG. 2, F denotes the original image, and B denotes a single block. For simplicity of explanation, the block B is assumed to comprise $6 \times 6$ picture elements in the descriptions below.

In the block transformation circuit 10, the original image signals S are also divided into blocks B' whose picture element regions are deviated from the picture element regions of the blocks B. The blocks B' as indicated by the broken lines in FIG. 2 are each composed of the signals at the $6 \times 6$ picture elements as in the case of the blocks B, and are deviated in two directions by a distance equal to one half of the block length from the blocks B. Image signals x' in each of the blocks B' are fed to a mean value calculating circuit 20 which calculates a mean value n of the image signals x' in each of the blocks B'.

The mean value signals Dn representing the mean values n in the blocks B' and generated by the mean value calculating circuit 20 are fed to a difference calculating circuit 21. The difference calculating circuit 21 receives the mean value signals Dn and the original image signals x in each of the blocks B, and calculates differences (x−m) between the original image signals x and a representative value m of signals in each of the blocks B. As one of the features of the present invention, the representative value m of signals in each of the blocks B is variable among different regions in each of the blocks B. Specifically, as shown in detail in FIG. 3, a single block B overlaps partial regions of four blocks B' (i.e. B'1, B'2, B'3 and B'4) at which the mean values n of signals are to be calculated. As for a partial region R1 in the block B, whose picture element region overlaps the picture element region of the block B'1, the mean value n1 of signals in the block B'1 is utilized as the aforesaid representative value m. In the same manner, the mean values n2, n3 and n4 in the blocks B'2, B'3 and B'4 are utilized respectively as the representative values m for the partial regions R2, R3 and R4 in the block B.

Signals xd representing the differences (xi−m) calculated in the manner as mentioned above and the mean value signals Dn representing the mean values n are then fed to a vector quantizer 11. The vector quantizer 11 selects a vector, that corresponds with the minimum distortion to the set of the fed differences ($x_1-m$, $x_2-m$, $x_3-m$, ..., $x_{36}-m$) in each of the blocks B, from a plurality of vectors stored in advance as a code book in a memory 12. Specifically, the memory 12 stores a code book representing, by way of example, 64 vectors $\bar{x}(1), \bar{x}(2), \bar{x}(3), \ldots, \bar{x}(64)$ respectively defining 36 vector elements $$\hat{x}_1^{(n)}, \hat{x}_2^{(n)}, \ldots, \hat{x}_{36}^{(n)}$$

where n=1, 2, ..., 64 as shown below.

$$x(1) = (\hat{x}_1^{(1)}, \hat{x}_2^{(1)}, \hat{x}_3^{(1)} \ldots \hat{x}_{36}^{(1)})$$
$$\bar{x}(2) = (\hat{x}_1^{(2)}, \hat{x}_2^{(2)}, \ldots \hat{x}_{36}^{(2)})$$
$$\bar{x}(3) = (\hat{x}_1^{(3)}, \hat{x}_2^{(3)}, \ldots \hat{x}_{36}^{(3)})$$
$$\vdots$$
$$\bar{x}(64) = (\hat{x}_1^{(64)}, \hat{x}_2^{(64)} \ldots \hat{x}_{36}^{(64)})$$

The vector quantizer 11 finds a vector $\bar{x}(t)$ whose vector elements ($\hat{x}_1, \hat{x}_2, \hat{x}_3, \ldots, \hat{x}_{36}$) correspond with the minimum distortion to the aforesaid set of the differences ($x_1-m$, $x_2-m$, $x_3-m$, ..., $x_{36}-m$), and outputs an encoded signal Dt which represents a vector identification number "t" representing the vector $\bar{x}(t)$. Also, the vector quantizer 11 outputs the aforesaid means value signals Dn together with the vector discrimination signal Dt.

As mentioned above, the fluctuation width of the differences between the original image signals xi and the representative value m (i.e. the mean value n1, n2, n3 or n4) is smaller than the fluctuation width of the original image signals xi. Therefore, the numerical width between the minimum value and the maximum value of the vector elements defined for the respective vectors in the code book may be small, and consequently the number of the vectors which are to be prepared in advance may be small.

As the aforesaid distortion, by way of example, the mean square error expressed as $$d = \frac{1}{k} \sqrt{\sum_{i=1}^{k} |(x_i - m) - \hat{x}_i|^2}$$

is utilized (k=36 in this example). In order to find such a vector $\bar{x}(t)$ that the distortion is the minimum, the distortion may be calculated for all of the vectors, and the vector $\bar{x}(t)$ exhibiting the minimum distortion may be found (this method is referred to as total search type vector quantization). Alternatively, in order to shorten the processing time, binary tree search type vector quantization may be carried out though the distortion may not completely become the minimum.

An appropriate code book comprising the vectors respectively defining the vector elements ($\hat{x}_1, \hat{x}_2, \hat{x}_3, \ldots, \hat{x}_{36}$) may be prepared by preparing a training image of the same type as the image on which signal compression is to be carried out, and using a known method on the basis of the training image.

In this embodiment, the vector discrimination signal Dt ma be such that the 64 vectors can be discriminated from one another, and can therefore be expressed by 6 bits. Also, in the case where the aforesaid mean values n are expressed with 8 bits, the mean value signals Dn per block B may be of 8 bits. Therefore, in the case where the density scale of each picture element is of 256 levels (=8 bits), the image signals in the amount of 8 bits×36 (picture elements) can be expressed by 6 bits+8 bits, and the signal compressibility becomes approximately 1/20.6.

The vector selection and the output of the vector discrimination signal Dt and the mean value signals Dn as mentioned above are carried out for all of the blocks B in a single image which the original image signals S represent. In this embodiment, the vector discrimination signals Dt and the mean value signals Dn obtained in this manner are recorded on a recording medium (image file) such as an optical disk or a magnetic disk in a recording and reproducing apparatus 13. In the case where the division of the overall original image signals S into the blocks is carried out in a predetermined sequence, the vector discrimination signals Dt and the mean value signals Dn fed sequentially to the recording and reproducing apparatus 13 can be recorded so as to correspond to the respective blocks B. In order to have the vector discrimination signals Dt and the mean value signals Dn correspond to the respective blocks B, block discrimination signals may be added to the vector discrimination signals Dt and the mean value signals Dn in the course of the recording. As mentioned above, each of the vector discrimination signals Dt and the mean value signals Dn can be expressed by a signal amount markedly smaller than the amount of the original image signals x, a large number of the images can be recorded on the recording medium such as the optical disk.

Figure 3:
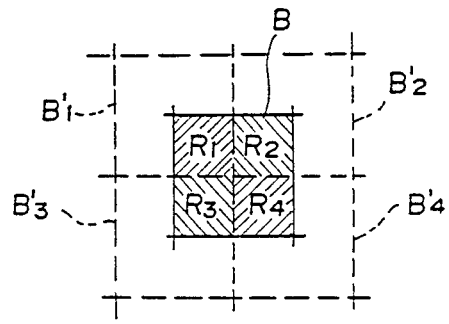
FIG. 3 is an explanatory view showing the relationship between the block subjected to vector quantization and the blocks at which representative values of image signals are calculated.

In the course of image reconstruction, each of the vector discrimination signals Dt and the mean value signals Dn indirectly representing the image signals is read from the recording medium, and is transformed by a decoder 14 into reconstructed signals y. Specifically, the decoder 14 reads the vector, which the vector discrimination signal Dt fed thereto represents, from the code book stored in the memory 12, and outputs the signals obtained by adding the mean values n, which the mean value signals Dn represent, to the vector elements $(\hat{x}_1, \hat{x}_2, \hat{x}_3, \ldots, \hat{x}_{36})$, which are defined for said vector, as the reconstructed signals y for a single block B. In this case, the mean value n1 at the block B'1 is added to the vector elements $\hat{x}_i$ corresponding to the image signals xi in the partial region R1 as shown in FIG. 3. In the same manner, the mean values n2, n3 and n4 are respectively added to the vector elements $\hat{x}_i$ corresponding to the image signals xi in the partial regions R2, R3 and R4. The vector elements $\hat{x}$ correspond with a slight distortion to the aforesaid differences (xi−m), and therefore the reconstructed signals y obtained by adding the means value n1, n2, n3 or n4 as the representative value m to the vector elements $\hat{x}$ correspond with a slight distortion to the original image signals x.

The reconstructed image signals y are then sent to a composing circuit 16. In the composing circuit 16, the reconstructed image signals y are transformed from the signals per block to the signals for a single image. The image signals S' obtained by said transformation in the composing circuit 16 have slight distortion with respect to the original image signals S, and are approximately equal to the original image signals S. The image signals S' are ultimately sent to an image reproducing apparatus 17. In the image reproducing apparatus 17, an image approximately identical with the original image that the original image signals S represent is reproduced on the basis of the image signals S'.

In the aforesaid embodiment, the mean values n1, n2, n3 and n4 of signals in the blocks B'1, B'2, B'3 and B'4 each of which has regions extending over a single block B and the blocks B adjacent to said block B are utilized as the representative values m of signals in the block B. Therefore, the values of the image signals in the aforesaid adjacent blocks B are reflected on the set of the differences $(x_1-m, x_2-m, x_3-m, \ldots, x_{36}-m)$, and generation of the block distortion in the reconstructed image can be prevented.

Figure 4:
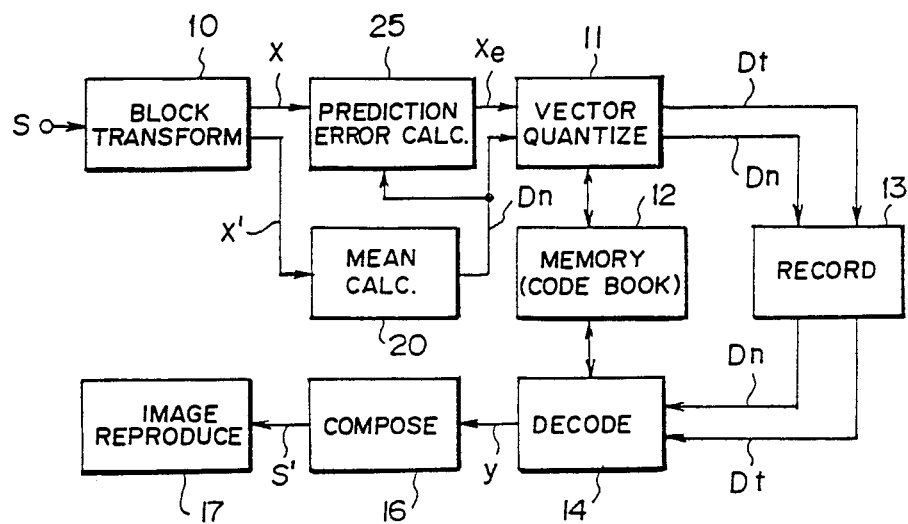
FIG. 4 is a block diagram showing the configuration of an apparatus for carrying out the second method of compressing image signals by vector quantization in accordance with the present invention.
Figure 5:
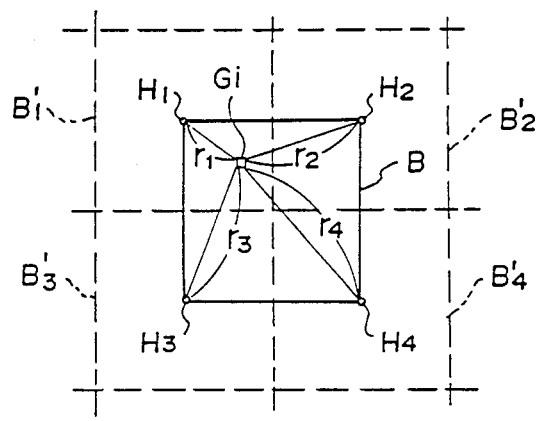
FIG. 5 is an explanatory view showing the method of calculating the interpolation-predicted values of the image signals in the second method of compressing image signals by vector quantization in accordance with the present invention.

An embodiment of the second method of compressing image signals by vector quantization in accordance with the present invention will hereinbelow be described with reference to FIG. 4. In FIG. 4, similar elements are numbered with the same reference numerals with respect to FIG. 1. With reference to FIG. 4, the original image signals x in each of the blocks B generated by the block transformation circuit 10 and the mean value signals Dn generated by the mean value calculating circuit 20 are fed to a prediction error calculating circuit 25. Based on the mean value signals Dn, the prediction error calculating circuit 25 first carries out interpolation prediction of the image signals at the respective picture elements. Specifically, as shown in FIG. 5 by way of example, the prediction error calculating circuit 25 calculates a value $\overset{\bullet}{x}i$ expressed as $$\overset{\bullet}{x}i = \frac{1}{T}(n_1/r_1^2 + n_2/r_2^2 + n_3/r_3^2 + n_4/r_4^2)$$

where $T = 1/r_1^2 + 1/r_2^2 + 1/r_3^2 + 1/r_4^2$ by weighted averaging of the mean values n1, n2, n3 and n4 with reciprocals of square values of distances r1, r2, r3 and r4 of a picture element Gi in the block B from block corners H1, H2, H3 and H4 which respectively coincide with the centers of the blocks B'1, B'2, B'3 and B'4. The prediction error calculating circuit 25 takes the value $\overset{\bullet}{x}i$ as the interpolation-predicted value at the picture element Gi. Then, the prediction error calculating circuit 25 calculates the errors, i.e. the interpolation prediction errors, $(xi - \overset{\bullet}{x}i)$ between the actual image signals xi and the interpolation-predicted values xi in the block B as calculated in this manner.

Signals xe representing the interpolation prediction errors $(xi - \overset{\bullet}{x}i)$ and the mean value signals Dn representing the mean values n are fed to the vector quantizer 11. The vector quantizer 11 selects a vector whose vector elements $(\hat{x}_1, \hat{x}_2, \hat{x}_3, \ldots, \hat{x}_{36})$ correspond with the minimum distortion to the set of the fed interpolation prediction errors $(x_1 - \overset{\bullet}{x}_1, x_2 - \overset{\bullet}{x}_2, x_3 - \overset{\bullet}{x}_3, \ldots, x_{36} - \overset{\bullet}{x}_{36})$ in each of the blocks B from a plurality of vectors stored in advance as a code book in the memory 12. Setting of the code book and selection of the vector are carried out in the same manner as in the embodiment shown in FIG. 1. Also, in this case, the fluctuation width of the interpolation prediction errors $(xi - \overset{\bullet}{x}i)$ becomes smaller than the fluctuation width of the original image signals xi, and therefore the number of the vectors which are to be prepared in advance may be small.

In the course of image reconstruction, the decoder 14 reads the vector, which the vector discrimination signal Dt fed thereto represents, from the memory 12 and outputs the signals $(\hat{x}_1 + \overset{\bullet}{x}_1, \hat{x}_2 + \overset{\bullet}{x}_2, \ldots, \hat{x}_{36} + \overset{\bullet}{x}_{36})$ obtained by adding the interpolation-predicted values $\overset{\bullet}{x}_1, \overset{\bullet}{x}_2, \overset{\bullet}{x}_3, \ldots, \overset{\bullet}{x}_{36}$ to the vector elements $(\hat{x}_1, \hat{x}_2, \hat{x}_3, \ldots, \hat{x}_{36})$ where $n = 1, 2, \ldots, 64$, which are defined for said vector, as the reconstructed signals y for a single block B.

In the aforesaid embodiment of the second method of compressing image signals by vector quantization in accordance with the present invention, the mean values n1, n2, n3 and n4 of signals in the blocks B'1, B'2, B'3 and B'4 each of which has regions extending over a single block B and the blocks B adjacent to said block B are utilized in the course of calculating the interpolation-predicted values xi in the block B. Therefore, also in this case, the values of the image signals in the aforesaid adjacent blocks B are reflected on the set of the interpolation prediction errors $(x_1 - \overset{\bullet}{x}_1, x_2 - \overset{\bullet}{x}_2, x_3 - \overset{\bullet}{x}_3, \ldots, x_{36} - \overset{\bullet}{x}_{36})$, and generation of the block distortion in the reconstructed image can be prevented.

In the aforesaid embodiments, the size of each of the blocks B in which vector quantization is to be carried out and the size of each of the blocks B' in which the representative values m (i.e. the mean values n1, n2, n3 and n4) are to be calculated are adjusted to be equal to each other. However, the size of each of the blocks B and the size of each of the blocks B' may be different from each other.

Also, instead of directly storing the mean value signals, the mean value signals may be compressed by a known method such as prediction encoding or encoding by orthogonal transformation. Further, in both the representative value separation type vector quantization and the vector quantization of the interpolation prediction errors, the signals may be normalized.

Figure 6:
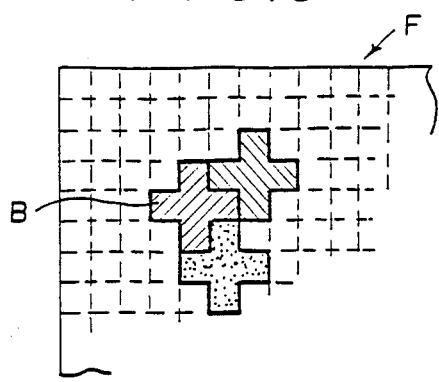
FIGS. 6, 7 and 8 are explanatory views showing various different examples of the blocks.
Figure 7:
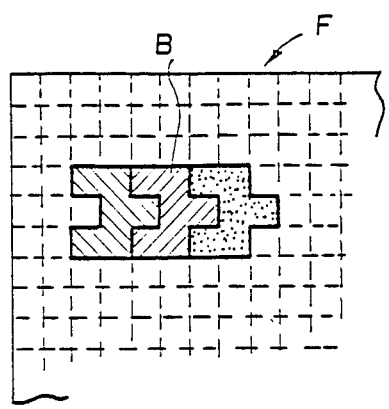
Figure 8:
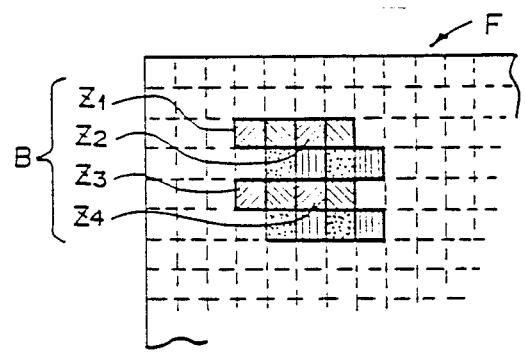

The blocks employed in the above-described embodiment are in the rectangular shape having a size of M×N picture elements. However, the blocks may be of different shape as shown in FIGS. 6, 7 and 8. In these figures, small square elements show picture elements and the areas B enclosed by solid lines show the picture element ranges picked up for dividing elements into the blocks. The elements constituting one block may not always be adjacent to each other as shown in FIGS. 6 and 7 but may be located close to each other as shown in FIG. 8. By using the blocks of the shape different from the rectangular shape, the prominent step-like appearance of density difference can be eliminated.

I claim:

1. A method of compressing image signals by vector quantization, which comprises the steps of:
   (i) dividing two-dimensional image signals into blocks B wherein each of said block B is composed of the signals at M number of picture elements adjacent to one another,
   (ii) selecting a vector that corresponds with the minimum distortion to differences ($x_1-m$, $x_2-m$, $x_3-m$, ..., $x_M-m$) between the image signals x in each of the blocks B and a representative value m of signals from a code book comprising a plurality of vectors different from one another and prepared in advance by defining M number of vector elements, and
   (iii) encoding the information representing the selected vector, and the information representing the representative value m,
   wherein the improvement comprises the steps of:
   (a) dividing said two-dimensional image signals into blocks B' whose picture element regions are deviated from the picture element regions of said blocks B,
   (b) calculating a representative value n with respect to the image signals in each of said blocks B', and
   (c) for each of partial regions R, whose picture element regions overlap the picture element regions of said blocks B', within each of said blocks B, using said representative value n, which is calculated for one of said blocks B' that includes one of said partial regions R, as said representative value m for said one of said partial regions R.

2. A method as defined in claim 1 wherein said representative value n is a mean value of the image signal in each of said blocks B'.

3. A method of compressing image signals by vector quantization, which comprises the steps of:
   (i) dividing two-dimensional image signals into blocks B wherein each of said blocks B is composed of the signals at M number of picture elements adjacent to one another,
   (ii) selecting a vector that corresponds with the minimum distortion to errors ($x_1-\dot{x}_1$, $x_2-\dot{x}_2$, $x_3-\dot{x}_3$, ..., $x_M-\dot{x}_M$) between the image signals x in each of the blocks B and interpolation-predicted values $\dot{x}$ for the image signals x from a code book comprising a plurality of vectors different from one another and prepared in advance by defining M number of vector elements, and
   (iii) encoding the information representing the selected vector, and the information utilized for calculating the interpolation-predicted values $\dot{x}$,
   wherein the improvement comprises the steps of:
   (a) dividing said two-dimensional image signals into blocks B' whose picture element regions are deviated from the picture element regions of said blocks B,
   (b) calculating a representative value n with respect to the image signals in each of said blocks B', and
   (c) predicting said interpolation-predicted values $\dot{x}$ in each of said blocks B on the basis of said representative values n with respect to all of said blocks B' whose picture element regions partially overlap the picture element region of each of said blocks B.

4. A method as defined in claim 3 wherein said representative value n is a mean value of the image signals in each of said blocks B'.

* * * * *